United States Patent
Liu et al.

(10) Patent No.: US 7,811,149 B2
(45) Date of Patent: Oct. 12, 2010

(54) METHOD FOR FABRICATING CARBON NANOTUBE-BASED FIELD EMISSION DEVICE

(75) Inventors: Peng Liu, Beijing (CN); Kai-Li Jiang, Beijing (CN); Kai Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 572 days.

(21) Appl. No.: 11/490,810

(22) Filed: Jul. 21, 2006

(65) Prior Publication Data
US 2007/0103048 A1    May 10, 2007

(30) Foreign Application Priority Data
Nov. 4, 2005    (CN) .................. 2005 1 0101025

(51) Int. Cl.
*H01J 19/24* (2006.01)
(52) U.S. Cl. .................. 445/46; 313/495; 427/77
(58) Field of Classification Search .......... 313/311, 313/495–497; 445/46–50; 427/77
See application file for complete search history.

(56) References Cited

U.S. PATENT DOCUMENTS

| | | | |
|---|---|---|---|
| 4,439,178 A | | 3/1984 | Mulzet |
| 5,622,652 A | * | 4/1997 | Kucherovsky et al. ...... 252/511 |
| 6,097,138 A | * | 8/2000 | Nakamoto .................. 313/309 |
| 6,183,714 B1 | | 2/2001 | Smalley et al. |
| 6,232,706 B1 | | 5/2001 | Dai et al. |
| 6,250,984 B1 | * | 6/2001 | Jin et al. .................. 445/51 |
| 6,282,226 B1 | | 8/2001 | Furukawa |
| 6,283,812 B1 | | 9/2001 | Jin et al. |
| 6,312,303 B1 | | 11/2001 | Yaniv et al. |
| 7,115,013 B2 | | 10/2006 | Liu et al. |
| 2002/0042241 A1 | | 4/2002 | Hsu |
| 2003/0027478 A1 | | 2/2003 | Park et al. |

(Continued)

FOREIGN PATENT DOCUMENTS

CN    1292354 A    4/2001

(Continued)

OTHER PUBLICATIONS

Jiang et al., Spinning continuous carbon nanotube yarns, Nature, Oct. 24, 2002, 801, vol. 419.

(Continued)

*Primary Examiner*—Nimeshkumar D Patel
*Assistant Examiner*—Christopher M Raabe
(74) *Attorney, Agent, or Firm*—Jeffrey T. Knapp

(57) ABSTRACT

An exemplary method for fabricating a carbon nanotube-based field emission device is provided. A substrate is provided. A catalyst layer is formed on the substrate. A carbon nanotube array is grown from the catalyst layer. The carbon nanotube array includes a root portion and an opposite top portion respectively being in contact with and away from the catalyst layer. A cathode base with an adhesive layer formed thereon is provided. The top portion of the carbon nanotube array is immersed into the adhesive layer. The adhesive layer is solidified to embed the immersed top portion into the solidified adhesive layer. The root portion of the carbon nanotube array is exposed.

12 Claims, 2 Drawing Sheets

U.S. PATENT DOCUMENTS

| | | | |
|---|---|---|---|
| 2003/0049381 A1 | 3/2003 | Mirkin et al. | |
| 2004/0105807 A1* | 6/2004 | Fan et al. | 423/447.3 |
| 2004/0136896 A1* | 7/2004 | Liu et al. | 423/447.3 |
| 2004/0150311 A1 | 8/2004 | Jin | |
| 2004/0166235 A1* | 8/2004 | Fujii et al. | 427/77 |
| 2004/0184981 A1 | 9/2004 | Liu et al. | |
| 2004/0189177 A1 | 9/2004 | Liu et al. | |
| 2004/0192152 A1* | 9/2004 | Liu et al. | 445/51 |
| 2004/0209385 A1 | 10/2004 | Liu et al. | |
| 2005/0153618 A1* | 7/2005 | Kuo et al. | 445/49 |
| 2005/0212394 A1 | 9/2005 | Lin et al. | |
| 2006/0108906 A1* | 5/2006 | Gosain et al. | 313/309 |
| 2006/0238095 A1* | 10/2006 | Nam | 313/311 |

FOREIGN PATENT DOCUMENTS

| | | | |
|---|---|---|---|
| CN | 1534709 A | 10/2004 | |
| EP | 1092680 A1 | 4/2001 | |
| JP | P2000-223005 A | 8/2000 | |
| JP | P2001-146409 A | 5/2001 | |
| JP | 2001220674 | 8/2001 | |
| JP | P2002-206169 A | 7/2002 | |
| JP | 2003286017 A | * | 10/2003 |
| JP | P2004-127737 A | 4/2004 | |
| JP | 2004241295 | 8/2004 | |
| JP | P2004-281388 A | 10/2004 | |
| JP | 2004338982 | 12/2004 | |
| JP | P2004-338982 A | 12/2004 | |
| JP | 2005-129406 A | 5/2005 | |
| JP | 2006008473 | 1/2006 | |

OTHER PUBLICATIONS

Fan et al., Monitoring the growth of carbon nanotubes by carbon isotope labelling, Nanotechnology, Sep. 5, 2003, 1118-1123, vol. 14.

* cited by examiner

METHOD FOR FABRICATING CARBON NANOTUBE-BASED FIELD EMISSION DEVICE

CROSS-REFERENCE TO RELATED APPLICATION

This application is related to two copending U.S. patent applications respectively entitled "METHOD FOR MAKING CARBON NANOTUBE-BASED FIELD EMISSION DEVICE", filed with the application Ser. No. 10/811,415; and entitled "CARBON NANOTUBE-BASED FIELD EMISSION DEVICE", filed with the application Ser. No. 10/811,442. The disclosure of the above-identified applications is incorporated herein by reference.

TECHNICAL FIELD

This invention relates generally to field emission areas, and more particularly to methods for fabricating carbon nanotube-based field emission devices.

BACKGROUND

Carbon nanotubes are very small tube-shaped structures having the composition of a graphite sheet, formed as a tube. Carbon nanotubes produced by arc discharge between graphite rods were first reported in an article by Sumio Iijima entitled "Helical Microtubules of Graphitic Carbon" (Nature, Vol. 354, Nov. 7, 1991, pp. 56-58).

Carbon nanotubes typically have excellent performance; in particular, excellent electron emission capability. Furthermore, carbon nanotubes can carry high electric currents reliably. Due to these properties, carbon nanotubes are considered to be an ideal field emission material for application in a variety of field emission devices, Such as vacuum electron sources, field emission flat panel displays, etc.

A carbon nanotube-based field emission device typically includes a cathode base and a carbon nanotube layer acting as field emitter formed on the cathode base. Recently, both the direct growth method, such as chemical vapor deposition (CVD), and the screen-printing method using carbon nanotube-based paste have been recognized as two promising techniques for the formation of the carbon nanotube layer on the cathode base.

Specifically, the direct growth method for the formation of a conventional carbon nanotube-based field emission device usually includes the steps of: providing a cathode base with a catalyst layer formed thereon; introducing a carbon source gas flowing over the catalyst layer; forming a carbon nanotube layer originating from the catalyst layer on the cathode base by way of a chemical vapor deposition process. The carbon nanotube layer is composed of a plurality of carbon nanotubes with top ends acting as field emitter tips. The top ends locate away from the cathode base. However, because distribution of the top ends is tangled, an emission current of the field emission device is non-uniform, as shown in FIG. 8.

The screen-printing method for the formation of a conventional carbon nanotube-based field emission device usually includes the steps of: providing a carbon nanotube-based silver paste which includes a plurality of carbon nanotubes randomly and multi-directionally disposed therein; screen-printing the paste on a cathode base; solidifying the paste formed on the cathode base. However, because the carbon nanotubes disposed in the paste are random and multidirectional, an emission current of the field emission device is not uniform too, as shown in FIG. 9.

What is needed is to provide a method for fabricating a carbon nanotube-based field emission device which can achieve a relatively more uniform emission current.

SUMMARY

A method for fabricating a carbon nanotube-based field emission device in accordance with a preferred embodiment is provided. A substrate is provided. A catalyst layer is formed on the substrate. A carbon nanotube array is grown from the catalyst layer. The carbon nanotube array includes a root portion and an opposite top portion respectively being in contact with and away from the catalyst layer. A cathode base with an adhesive layer formed thereon is provided. The top portion of the carbon nanotube array is immersed into the adhesive layer. The adhesive layer is solidified result in the immersed top portion being embedded into the solidified adhesive layer. The root portion of the carbon nanotube array is exposed.

Other advantages and novel features will become more apparent from the following detailed description of embodiments when taken in conjunction with the accompanying drawings.

BRIEF DESCRIPTION OF THE DRAWINGS

Many aspects of the present method for fabricating a carbon nanotube-based field emission device can be better understood with reference to the following drawings. The components in the drawings are not necessarily drawn to scale, the emphasis instead being placed upon clearly illustrating the principles of the present method. Moreover, in the drawings, like reference numerals designate corresponding parts throughout the several views.

The exemplifications set out herein illustrate at least one embodiment, in one form, and such exemplifications are not to be construed as limiting the scope of the present method in any manner.

DETAILED DESCRIPTION OF PREFERRED EMBODIMENTS

FIGS. 1-6 together illustrate successive stages in a process for fabricating a carbon nanotube-based field emission device, in accordance with a preferred embodiment.

Figure 1:
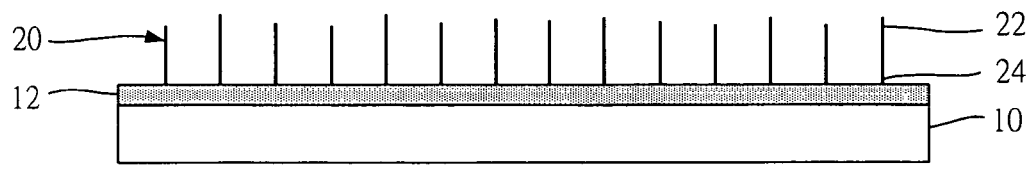
FIG. 1 is a schematic, side elevation view of a carbon nanotube array formed on substrate with a catalyst layer formed thereon, in accordance with a preferred embodiment, the carbon nanotube array including a top portion and an opposite root portion respectively being in contact with and away from the catalyst layer.

Referring to FIG. 1, a substrate 10 with a catalyst layer 12 formed thereon and a carbon nanotube array 20 originating from the catalyst layer 12 are shown. The carbon nanotube array 20 includes a top portion (not labeled) and an opposite root portion (not labeled). The carbon nanotube array 20 usually is composed of a plurality of substantially parallel carbon nanotubes. Each of the carbon nanotubes includes a top end 22 and a root end 24 opposite to the top end 22, and substantially extends along a direction oriented from the root end 24 to the top end 22. The root ends 24 of the carbon nanotubes constitute the root portion of the carbon nanotube array 20 and are in contact with the catalyst layer 12. The top ends 22 of the carbon nanotubes constitute the top portion of the carbon nanotube array 20 and are away from the catalyst layer 12. Generally, distribution of the root ends 24 of the carbon nanotubes is more uniform than that of the top ends 22 thereof since the root ends 24 are fixed on the catalyst layer 12 rather than are free like the top ends during the growth process of the carbon nanotube array 20.

In the illustrated embodiment, the formation of the carbon nanotube array 20 can be carried out by chemical vapor deposition methods, such as example one and example two as described below.

Example One

In the first example, the formation of the carbon nanotube array 20 is a product of a series of sub-steps as described below. Firstly, a substrate 10 is provided. The substrate 10 is a silicon wafer or a silicon wafer with a silicon oxide (SiOx) layer formed thereon. Preferably, the substrate 10 is polished (e.g. via a chemical mechanical polishing process) to reach a surface roughness of no more than 1 micrometer, which facilitates the root ends of carbon nanotubes of the resultant carbon nanotube array 20 substantially locating at a common flat surface. Secondly, a catalyst layer 12 is formed on the substrate 10 by a sputtering method, an electron beam evaporation method or a solution method. The catalyst layer 12 typically has a thickness in the range from several nanometers to hundreds of nanometers. The catalyst layer 12 can be composed of a metal, such as iron (Fe), cobalt (Co), nickel (Ni), molybdenum (Mo), aluminum (Al) or an alloy thereof. Thirdly, the substrate 10 and the catalyst layer 12 together are heated up to and retained at a temperature of about 300~400 degrees Celsius (° C.) in an oxygen-containing environment for annealing the catalyst layer 12, and then the catalyst layer 12 is transformed into a plurality of nano-sized (typically less than 1 micrometer) catalyst particles which are uniformly arranged on the substrate 10 in the form of array after being annealed for about 10 hours. Fourthly, the substrate 10 and the catalyst layer 12 in the form of nano-sized catalyst particle array together are placed in a quartz furnace and heated up to a temperature of 500~700° C. in a protective gas which is continuously introduced into the furnace. The protective gas can be nitrogen gas or an inert gas such as, argon. Alternatively, the substrate 10 and the catalyst layer 12 can be placed in quartz furnace directly without the annealing step. Fifthly, a carbon source gas, such as acetylene is introduced into the quartz furnace, thereby a resultant carbon nanotube array 20 originating from the catalyst layer 12 is formed on the substrate 10 in a catalytic reaction process with the catalyst layer 12 and a mixture of the protective gas and the carbon source gas. The flow rates of the carbon source gas and the protective gas respectively are 30 standard cubic centimeters per minute (sccm) and 300 sccm. The carbon nanotube array 20 includes a plurality of substantially aligned and parallel carbon nanotubes. The root ends 24 of the carbon nanotubes substantially locate at a common flat surface and uniformly distribute on the substrate 10.

Example Two

In the second example, the formation of the carbon nanotube array 20 is actually a result of a series of sub-steps as described below. Firstly, a substrate 10 is provided. The substrate 10 is a porous silicon substrate. Preferably, the substrate 10 is polished to reach a surface roughness of no more than 1 micrometer. Secondly, a catalyst layer 12 is formed on the substrate 10 by a sputtering method, an electron beam evaporation method or a solution method. The catalyst layer 12 is a thin film composed of iron. Thirdly, the substrate 10 and the catalyst layer 12 together are heated up to and retained at a temperature of about 300° C. in an oxygen-containing environment for annealing the catalyst layer 12, and then the catalyst layer 12 is transformed into a plurality of nano-sized catalyst particles which are uniformly arranged on the substrate 10 in the form of array after being annealed for about 12 hours. Fourthly, the substrate 10 and the catalyst layer 12 in the form of nano-sized catalyst particle array together are placed in a quartz furnace and heated up to a temperature of about 690~710° C. in a protective gas (e.g. argon) which is continuously introduced into the furnace. Alternatively, the substrate 10 and the catalyst layer 12 can be placed in the quartz furnace directly without the annealing step. Fifthly, a carbon source gas, such as ethylene is introduced into the quartz furnace, thereby a resultant carbon nanotube array 20 originating from the catalyst layer 12 is formed on the substrate 10 in a catalytic reaction process with the catalyst layer 12 and a mixture of the protective gas and the carbon source gas. The flow rates of the carbon source gas and the protective gas respectively are 140 sccm and 260 sccm. The carbon nanotube array 20 includes a plurality of substantially aligned and parallel carbon nanotubes. The root ends 24 of the carbon nanotubes substantially locate at a common flat surface and uniformly distribute on the substrate 10.

Figure 2:
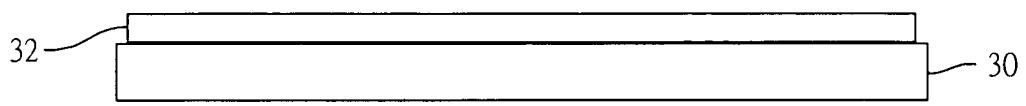
FIG. 2 is a schematic, side elevation view of a cathode base with an adhesive layer formed thereon, in accordance with the preferred embodiment.

Referring to FIG. 2, a cathode base 30 with an adhesive layer 32 formed thereon. At least one of the cathode base 30 and the adhesive layer 32 is electrically conductive. The cathode base 30 can be made of an insulating material, such as ceramic, glass, silicon oxide (SiOx); or an electrically conductive material, such as metal, silicon. The adhesive layer 32 can be made of an electrically conductive material, such as a silver paste; or an insulating material. Preferably, the adhesive layer 32 has a viscosity ranging from 50 to 200 centipoises. The formation of the adhesive layer 32 on the cathode base 30 can be carried out by way of a screen-printing method or a coating method (e.g. spin coating).

In the illustrated embodiment, the cathode base 30 is a glass substrate with a transparent conductive layer coated thereon. The adhesive layer 32 is a silver paste. The composition of the silver paste includes terpineol, ethyl cellulose, metal powder and glass powder. The metal powder can be silver powder.

Figure 3:
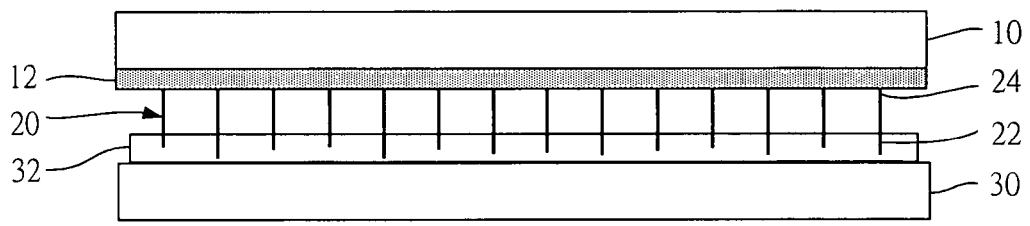
FIG. 3 is a schematic, side elevation view of the top portion of the carbon nanotube array of FIG. 1 being immersed in the adhesive layer of FIG. 2, in accordance with the preferred embodiment.

Referring to FIG. 3, the top ends 22 of the carbon nanotubes (i.e. the top portion of the carbon nanotube array 20) are immersed into the electrically conductive adhesive layer 32. This result is actually a product of a series of sub-steps: the substrate 10 and the cathode base 30 are disposed opposite to each other, in order to make the carbon nanotube array 20 face toward the adhesive layer 32. The top ends 22 are brought contact with the adhesive layer 32. An external force is applied on the substrate 10 to press and immerse the top ends 22 of the carbon nanotubes into the adhesive layer 32.

Figure 4:
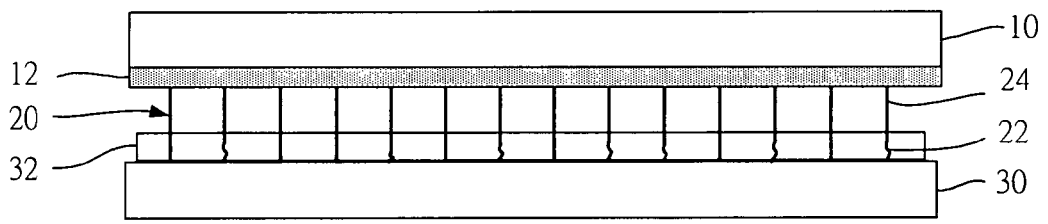
FIG. 4 is a schematic, side elevation view of the top portion of the carbon nanotube array of FIG. 1 being immersed in the adhesive layer of FIG. 2, which is similar to the FIG. 3, but shows the top portion of the carbon nanotube array being directly in contact with the cathode base, in accordance with another preferred embodiment.

Alternatively, the adhesive layer 32 being electrically insulative rather than electrically conductive as shown in FIG. 3, is illustrated in FIG. 4. The top ends 22 of the carbon nanotubes (i.e. the top portion of the carbon nanotube array 20) are immersed into the insulating adhesive layer 32 and directly in contact with the electrically conductive cathode base 30. The top ends of the carbon nanotubes having a relatively longer length usually are bent.

Figure 5:
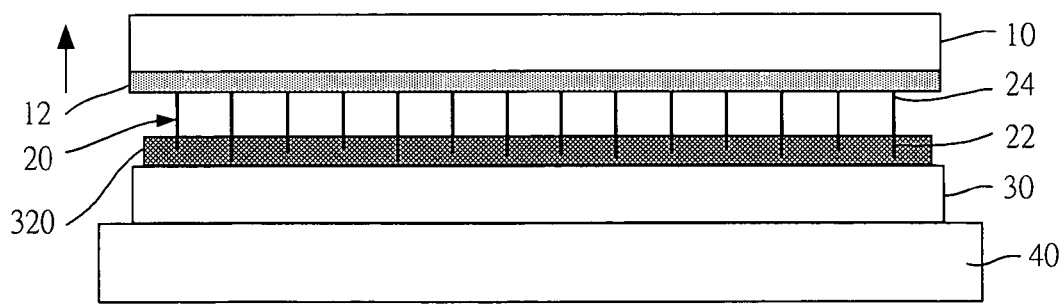
FIG. 5 is similar to FIG. 3, but shows the adhesive layer being solidified and the top portion of the carbon nanotube array is embedded thereinto, in accordance with the preferred embodiment.

Referring to FIG. 5, an apparatus 40 configured for solidifying the adhesive layer 32 is provided. The adhesive layer 32 (hereafter, is renumbered as 320) is sintered at a temperature of about 400~550° C. to be solidified by means of the apparatus 40. Consequently, the top ends 22 of the carbon nanotubes are embedded in the solidified adhesive layer 320.

Figure 6:
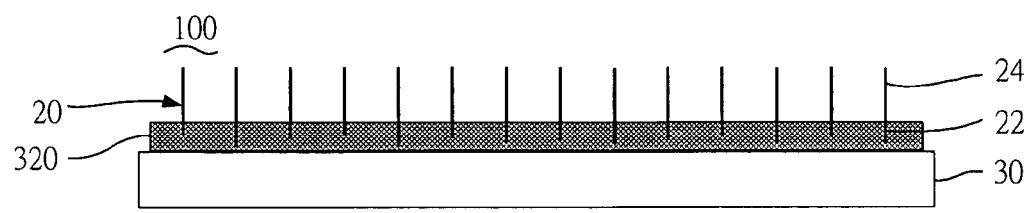
FIG. 6 is similar to FIG. 5, but shows the substrate and the catalyst layer formed thereon being removed, and the root portion of the carbon nanotube array being exposed, in accordance with the preferred embodiment.

Referring to FIG. 6, the substrate 10 and the catalyst layer 12 together being removed, is shown. In particular, the cathode base 30 is fixed, and an external force is applied on the substrate 10 and the catalyst layer 12 along a direction (as denoted by the arrow in FIG. 5) oriented from the cathode base 30 to the substrate 10. As such, the catalyst layer 12 and the carbon nanotube array 20 are separated from each other, and the root ends 24 of the carbon nanotubes (i.e. the root portion of the carbon nanotube array 20) are exposed. If necessary, the root ends 24 may be treated with laser irradiation in order to clean the root ends of the carbon nanotubes (i.e. get rid of remaining catalyst particles). Accordingly, a resultant carbon nanotube-based field emission device 100 can be obtained. In detail, the field emission device 100 includes the cathode base 30 with the adhesive layer 320 formed thereon together acting as a cathode electrode, and the carbon nanotube array 20. The carbon nanotube array 20 includes a plurality of carbon nanotubes each including the top end 22 and the opposite root end 24. The top ends 22 are embedded into the adhesive layer 320 configured for providing an electrical connection between the carbon nanotube array 20 and the cathode electrode. The root ends 24 uniformly distribute on a common flat surface perpendicular thereto and act as field emitter tips configured for emitting electrons therefrom.

Alternatively, the substrate 10 and the catalyst layer 12 can be removed from the carbon nanotube array 20 by way of etching off the catalyst layer 12, in order to expose the root ends 24 of the carbon nanotubes.

Figure 7:
FIG. 7 is a graph of emission current intensity distribution of a field emission device in accordance with a preferred embodiment.
Figure 8:
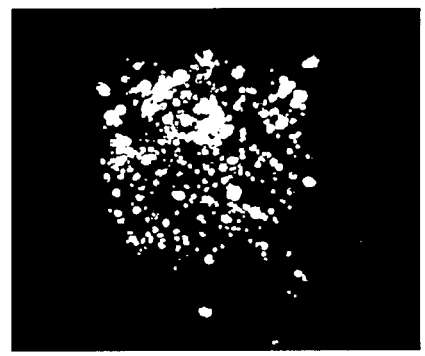
FIG. 8 is a graph of emission current intensity distribution of a conventional field emission device formed by a direct growth method.
Figure 9:
FIG. 9 is a graph of emission current intensity distribution of a conventional field emission device formed by a screen-printing method.

Referring to FIG. 7, a graph of emission current intensity distribution of the field emission device 100 is shown. Compared with the emission current intensity distribution graphs of conventional field emission devices respectively formed via a direct growth method (as shown in FIG. 8) and a screen-printing method (as shown in FIG. 9), the field emission device 100 has a relatively more uniform emission current. The uniformity of the emission current of the field emission device 100 mainly benefits from the uniform distribution of the field emitter tips.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for fabricating a carbon nanotube-based field emission device, comprising:
   providing a substrate with a carbon nanotube array formed thereon, the carbon nanotube array including a root portion and a top portion; and providing a cathode base with an adhesive layer formed thereon;
   causing the top portion of the carbon nanotube array to have direct contact with the cathode base;
   solidifying the adhesive layer to secure the carbon nanotube array to the cathode base; and
   exposing the root portion of the carbon nanotube array.

2. The method of claim 1, wherein the adhesive layer is electrically insulative and the cathode base is electrically conductive.

3. The method of claim 2, wherein the adhesive layer has a viscosity ranging from about 50 to about 200 centipoises before solidifying.

4. The method of claim 2, wherein a composition of the adhesive layer includes terpineol, ethyl cellulose, metal powder and glass powder.

5. The method of claim 4, wherein the metal powder is silver powder.

6. The method of claim 4, wherein the adhesive layer is solidified by way of sintering the adhesive layer at a temperature of about 400 to about 550 degrees Celsius.

7. The method of claim 1, wherein the step of exposing the root portion of the carbon nanotube array is carried out by way of etching a catalyst layer formed between the substrate and the carbon nanotube array.

8. The method of claim 1, wherein the step of exposing the root portion of the carbon nanotube array, comprises the sub-steps of:
   fixing the substrate;
   applying an external force on the cathode base along a direction oriented from the substrate to the cathode base, to separate the carbon nanotubes from the substrate, thereby the root portion of the carbon nanotube array being exposed; and
   optically treating the root portion of the carbon nanotube array with laser irradiation, to clean the root portion of the carbon nanotube array.

9. A carbon nanotube-based field emission device, comprising:
   a cathode base;
   an adhesive layer formed on the cathode base; and
   a carbon nanotube array having a first portion immersed in the adhesive layer and directly contacting with the cathode base;

wherein the adhesive layer is electrically insulative and the cathode base is electrically conductive.

10. The carbon nanotube-based field emission device of claim 9, wherein the carbon nanotube array comprises a plurality of carbon nanotubes, and some of ends of the carbon nanotubes in the first portion are bent, directly attached on the cathode base.

11. The carbon nanotube-based field emission device of claim 10, wherein the carbon nanotube array has a second portion opposite to the first portion, and ends of the carbon nanotubes in the second portion are perpendicular to the cathode base.

12. The carbon nanotube-based field emission device of claim 11, wherein a surface roughness of the first portion is larger than that of the second portion.

* * * * *